(12) United States Patent
Singleton

(10) Patent No.: US 8,064,564 B2
(45) Date of Patent: Nov. 22, 2011

(54) NEUTRON SHIELDING PANELS FOR REACTOR PRESSURE VESSELS

(75) Inventor: Norman R. Singleton, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 469 days.

(21) Appl. No.: 12/275,525

(22) Filed: Nov. 21, 2008

(65) Prior Publication Data

US 2009/0225930 A1 Sep. 10, 2009

Related U.S. Application Data

(60) Provisional application No. 60/992,158, filed on Dec. 4, 2007.

(51) Int. Cl.
*G21C 11/00* (2006.01)
*G21C 5/00* (2006.01)

(52) U.S. Cl. .......................... 376/287; 376/458

(58) Field of Classification Search ............... 376/287, 376/458, 459
See application file for complete search history.

(56) References Cited

U.S. PATENT DOCUMENTS

| | | | | |
|---|---|---|---|---|
| 3,868,302 A * | 2/1975 | Singleton | ....................... | 376/289 |
| 4,731,220 A * | 3/1988 | Kim, Jr. | ....................... | 376/458 |
| 4,743,423 A * | 5/1988 | Turner et al. | ................... | 376/287 |
| 4,941,159 A | 7/1990 | Schwirian et al. | | |
| 5,436,945 A | 7/1995 | Weisel et al. | | |
| 5,699,394 A | 12/1997 | Schreiber et al. | | |
| 2004/0020678 A1 * | 2/2004 | Gerving | ......................... | 174/59 |

* cited by examiner

*Primary Examiner* — Johannes P Mondt

(57) ABSTRACT

In a nuclear reactor neutron panels varying in thickness in the circumferential direction are disposed at spaced circumferential locations around the reactor core so that the greatest radial thickness is at the point of highest fluence with lesser thicknesses at adjacent locations where the fluence level is lower. The neutron panels are disposed between the core barrel and the interior of the reactor vessel to maintain radiation exposure to the vessel within acceptable limits.

13 Claims, 6 Drawing Sheets

NEUTRON SHIELDING PANELS FOR REACTOR PRESSURE VESSELS

CROSS REFERENCE TO RELATED APPLICATIONS

This application claims priority to Provisional Application 60/992,158, filed Dec. 4, 2007.

GOVERNMENT INTEREST

This invention was made with Government support under Contract No. DE-FC07-051D1436 awarded by the Department of Energy. The Government has certain rights in this invention.

BACKGROUND OF THE INVENTION

1. Field of the Invention

The present invention relates generally to nuclear reactor internals and more specifically to neutron shields for shielding nuclear reactor pressure vessels from overexposure to neutron flux.

2. Description of Related Art

The primary side of nuclear reactor power generating systems which are cooled with water under pressure comprises a closed circuit which is isolated from and in heat exchange relationship with a secondary side for the production of useful energy. The primary side comprises the reactor pressure vessel enclosing a core internals structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor pressure vessel independently. Each of the parts of the primary side comprising the steam generator, a pump and a system of pipes which are connected to the vessel, form a loop of the primary side. The primary side is also connected to auxiliary circuits, including a circuit for volumetric and chemical monitoring of the pressurized water. The auxiliary circuit, which is arranged branching from the primary circuit, makes it possible to maintain the quantity of water in the primary circuit by replenishing, when required, with measured quantities of water, and to monitor the chemical properties of the coolant water, particularly its content of boric acid, which is important to the operation of the reactor.

The internal components of the reactor pressure vessel typically include upper and lower internals. The upper internals include control rod guide tube assemblies, support columns, conduits for instrumentation which enter the reactor vessel through the closure head, and a fuel assembly alignment structure, referred to as the upper core plate. The lower internals include a core support structure referred to as the core barrel, a core shroud that sits inside the core barrel and converts the circular interior of the core barrel to a stepped pattern that substantially corresponds to the perimeter profile of the fuel assemblies that constitute the core supported between a lower core support plate and the upper core plate. The stepped pattern of fuel assemblies places the fuel assemblies closest to the core barrel at the four cardinal coordinates. As an alternate to the shroud, a bolted baffle former structure consisting of machined horizontal former and vertical baffle plates, has been employed. Whether a shroud or a bolted baffle former structure is employed the core pattern is still generally the same with the fuel assemblies being positioned closest to the core barrel at the cardinal coordinates.

In pressured water moderated and boiling water nuclear reactors, both of which are used for producing steam to drive a steam turbine, fission takes place within the reactor core whereby the energy of the fission products is transmitted to the water. In a pressurized water-moderated reactor the heated water is pumped from the reactor vessel through a heat exchanger in which heat energy is transferred to another circuit of water to form steam to drive a turbine. In a boiling water reactor the energy of the fission products is transmitted to the water in the reactor vessel to form steam to drive the turbine. In both types of reactor it has been found that neutron flux imposed on the vessel from the reactor core results in the material of the vessel becoming embrittled. That is, with prolonged exposure to high energy neutrons the fracture toughness of the vessel is reduced and could ultimately result in fracturing of the vessel should the condition be allowed to continue.

Several design techniques have been utilized in the past to reduce the radiation exposure of the vessel. For example, in pressured water reactors manufacturers have employed a steel thermal shield to reduce the radiation exposure of the vessel. In one such design illustrated in FIG. 1, the core barrel 32, which surrounds and supports the reactor core 14 within the vessel 10, is itself surrounded by a cylindrical steel wall 15 which is two to three inches (5.08 to 7.62 centimeters) thick and is situated approximately an equal distance from the inner surface of the pressure vessel 10 and the outer surface of the core barrel 32. In an alternative design, disclosed in U.S. Pat. No. 3,868,302, recognizing that the neutron flux level impinging on the inner surface of the reactor vessel 10 varies marketably in the circumferential direction, because some of the fuel assemblies 22 within the core 14 are closer to the core barrel 32 than other fuel assemblies 22, the thickness of the core barrel is selectively increased in those regions where a high flux exists. If the thickness of the core barrel is increased in the high flux regions by an amount corresponding to the thickness of the cylindrical thermal shield 15, the maximum radiation exposure of the reactor vessel 10 is essentially the same as the level that would result with a separate cylindrical thermal shield 15.

Another alternative that has been employed is to affix steel plates to the outside of the core barrel in the regions of the cardinal coordinates to essentially achieve the same affect that would be achieved by increasing the thickness of the core barrel in those areas, but at a lower expense. As the size of the reactors increase, requiring larger thermal shields, the steel plates forming the shields can experience large temperature excursions as they heat up and differences in thermal expansion between the shields and the core barrel can strain the means employed to attach the neutron shields to the core barrel. In addition, as the neutron shields become larger, they can affect the pressure drop within the downcomer region 31 between the core barrel and the reactor vessel which, in turn, increases the pressure drop across the reactor vessel and the amount of flow turbulence that is generated in the downcomer annulus.

Accordingly, an improved neutron shield design is desired that will reduce any adverse affect on pressure drop within the downcomer, region between the pressure vessel and the core barrel.

Furthermore, such an improved neutron shield design is desired that will minimize temperature differences between the thermal shield and the core barrel and reduce the strain on the means employed to attach the neutron shields to the core barrel.

SUMMARY OF THE INVENTION

The foregoing objectives are achieved in accordance with this invention by placing a plurality of circumferentially spaced apart neutron shield panels in the downcomer region of the reactor pressure vessel, with each panel having a generally concave surface facing the core barrel and a generally convex surface facing the pressure vessel inside wall. Each panel has a variable thickness between the concave face and the convex surface. Preferably, the thickness of the panel varies in the circumferential direction with the greatest thickness in the center and tapers to the sides. Desirably, the thickness is approximately three inches (7.62 centimeters) in the center and tapers approximately to one inch (2.54 centimeters) on the side. Preferably, the neutron shield panels are constructed of stainless steel and are tapered at the top to provide a gradual transition to the direction of flow of coolant down the downcomer.

In one embodiment, the neutron shield panels are constructed from a plurality of separate segments that are stacked vertically. Desirably, each of the segments are rectangular having two longer sides, the longer sides extending in the vertical direction. In the one preferred embodiment, the number of segments is three with each segment approximately the same size. The segments are preferably bolted to the core barrel and at least a portion of the concave surface of the neutron panel is spaced from an outside diameter of the core barrel by a stand-off such as the washer. In another preferred embodiment, the neutron panel segments have sloped opposing edges with each edge inversely matching the slope on the opposing edge of the adjacent segment wherein the opposing adjacent edges are spaced from each other. The space between the opposing edges permits reactor coolant to pass therebetween to assist in cooling the segments while reducing the passage of neutron fluence to the reactor vessel.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
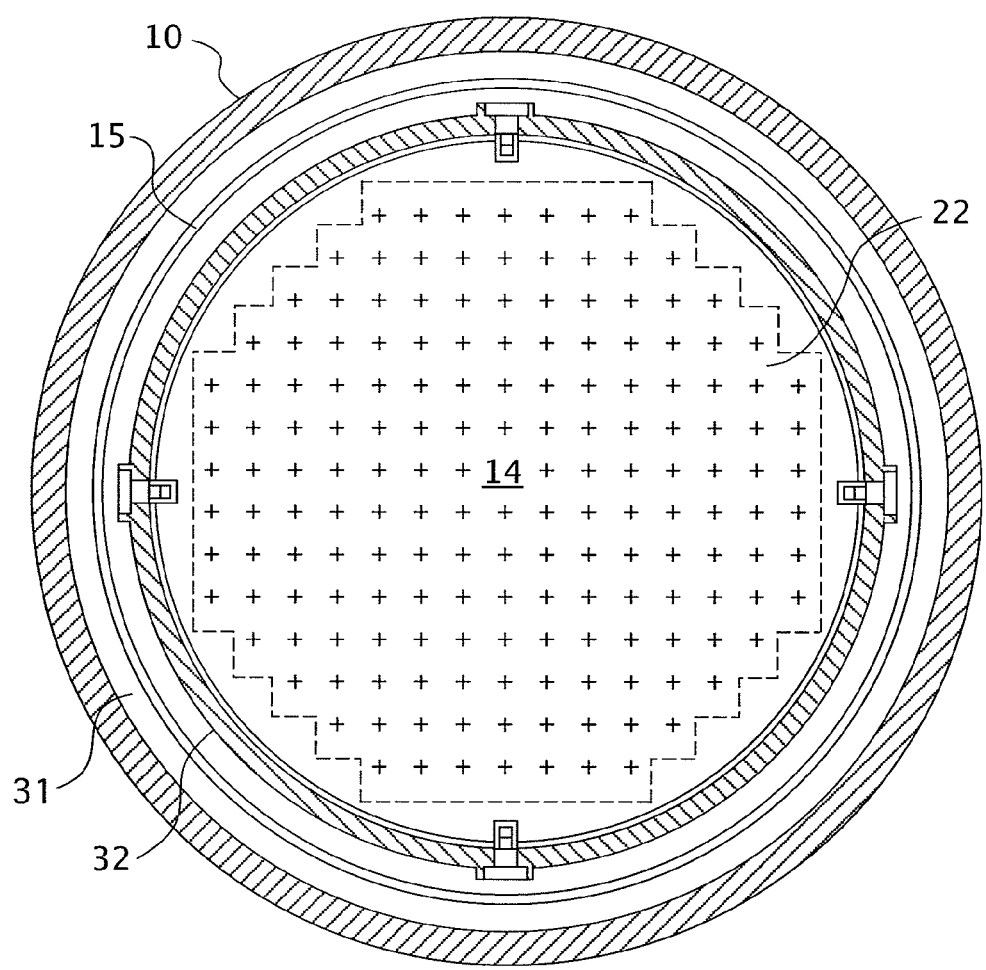
FIG. 1 is a cross sectional view of a nuclear reactor vessel showing the pressure vessel, thermal shield, core barrel, and an array of fuel assemblies in the core.
Figure 2:
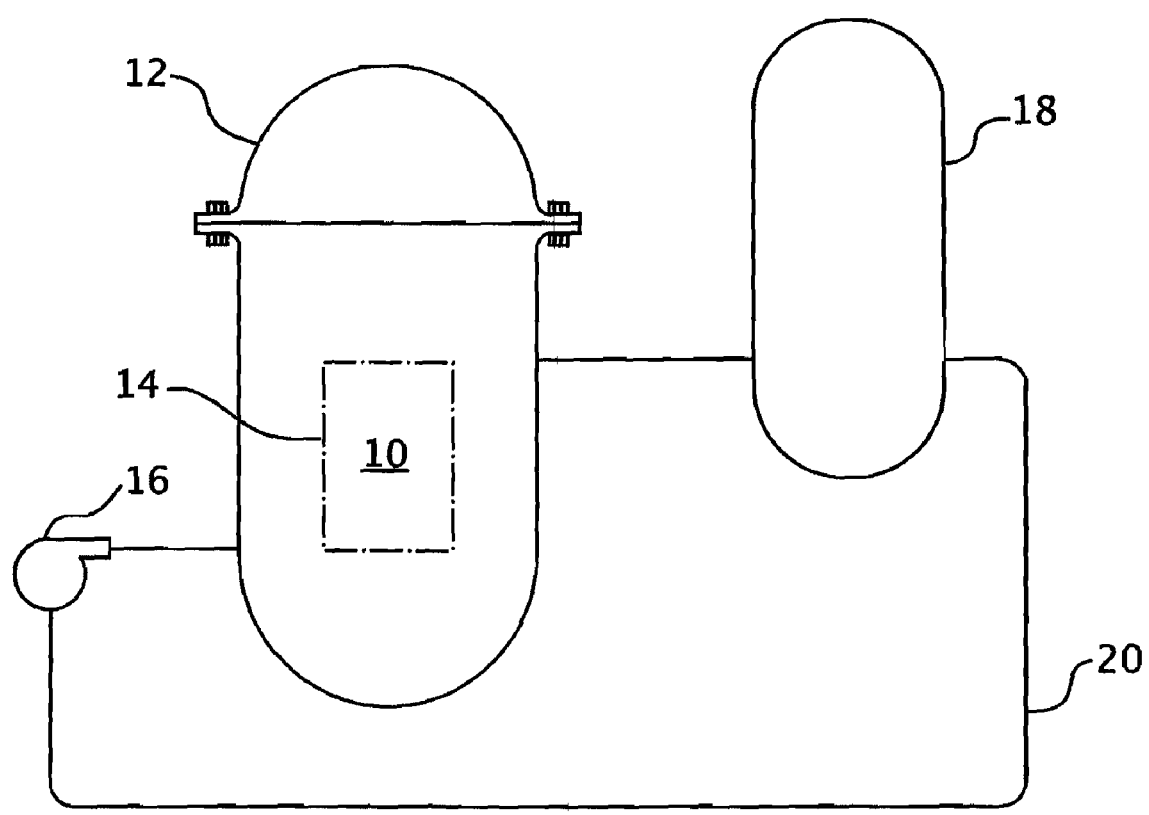
FIG. 2 is a simplified schematic of a nuclear reactor system to which this invention may be applied.

Referring now to the drawings, FIG. 2 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

Figure 3:
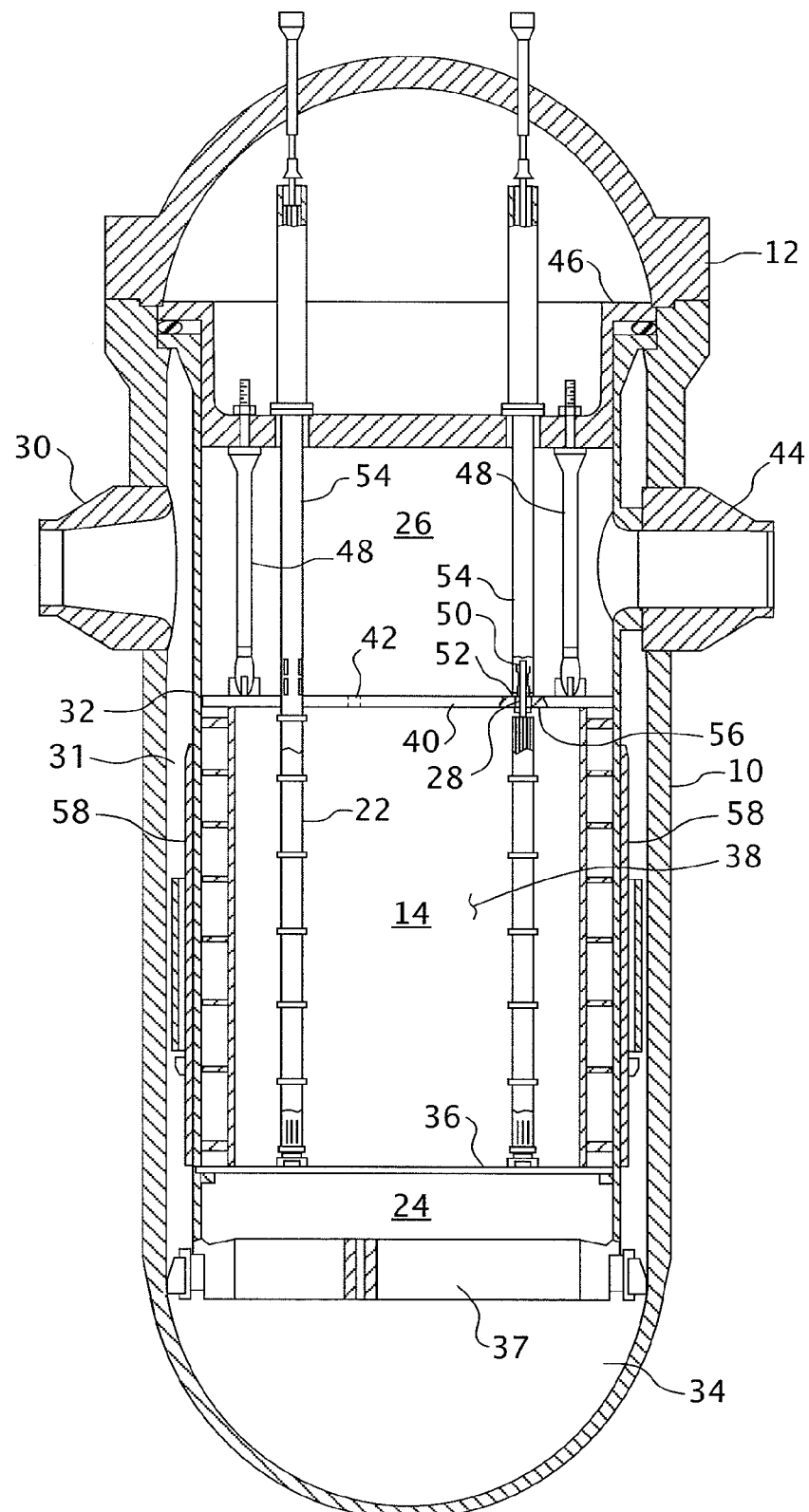
FIG. 3 is an elevational view, partially in section, of a nuclear reactor vessel and internal components to which this invention may be applied.

An exemplary reactor design is shown in more detail in FIG. 3. In addition, to the core 14 comprised of a plurality of parallel, vertically co-extending fuel assemblies 22, for purposes of this description, the other vessel internal structures can be divided into the lower internals 24 and the upper internals 26. In conventional designs, the lower internal's function is to support, align and guide core components and instrumentation, as well as direct flow within the vessel. The upper internals restrain or provide a secondary restraint for the fuel assemblies 22 (only two of which are shown for simplicity), and support and guide instrumentation and components, such as control rods 28.

In the exemplary reactor shown in FIG. 3, coolant enters the vessel 10 through one or more inlet nozzles 30, flows downward through an annulus or downcomer 31, between the vessel and the core barrel 32, is turned 180 degrees in a lower plenum 34, passes upwardly through a lower support plate 37 and a lower core plate 36 upon which the fuel assemblies 22 are seated and through and about the fuel assemblies. In some designs, the lower support plate 37 and the lower core plate 36 are replaced by a single structure, the lower core support plate, at the same location as 37. The coolant flow through the core and surrounding area 38 is typically large, on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outward nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly moveable control rods 28 typically include a drive shaft 60 and spider assembly 52 of neutron poison rods that are guided through the upper internals 26 and into aligned fuel assemblies 22 by control rod guide tubes 54. The guide tubes are fixedly joined to the upper support assembly 46 and connected by a split pin 56 force fit into the top of the upper core plate 40. The pin configuration provides for ease of guide tube assembly and replacement if ever necessary and assures that core loads, particularly under seismic or other high loading accident conditions are taken primarily by the support columns 48 and not the guide tubes 54. This assists in retarding guide tube deformation under accident conditions which could detrimentally affect control rod insertion capability.

As previously mentioned, it has been found that neutron flux imposed on the vessel from the reactor core results in the material of the reactor vessel becoming embrittled. For that reason, the maximum fluence that impinges on a reactor vessel is limited by the Nuclear Regulatory Commission in Regulatory Guide 1.99. To avoid exceeding these limitations, in some reactor designs, neutron shields 58, shown in FIG. 3, are placed around the core barrel at circumferentially spaced locations about the cardinal axis where the fluence is the greatest due to the proximity of the fuel assemblies. The neutron shields essentially extend along a height substantially equal to that of the fuel elements within the core. The thickness of the neutron shields 58 are gauged to reduce the neutron fluence on the reactor vessel 10 below the limits set by Regulatory Guide 1.99. As can be seen in FIG. 3, the neutron shields restrict the downcomer area between the walls of the vessel 10 and the core barrel 32 through which the incoming coolant is directed to reach the core 14, and, thus create a restriction on coolant flow. This invention minimizes that restriction by designing each neutron shield panel with a generally concave surface facing the core barrel and a generally convex surface facing the pressure vessel inside wall, with each panel having a variable thickness between the concave surface and the convex surface.

Figure 4:
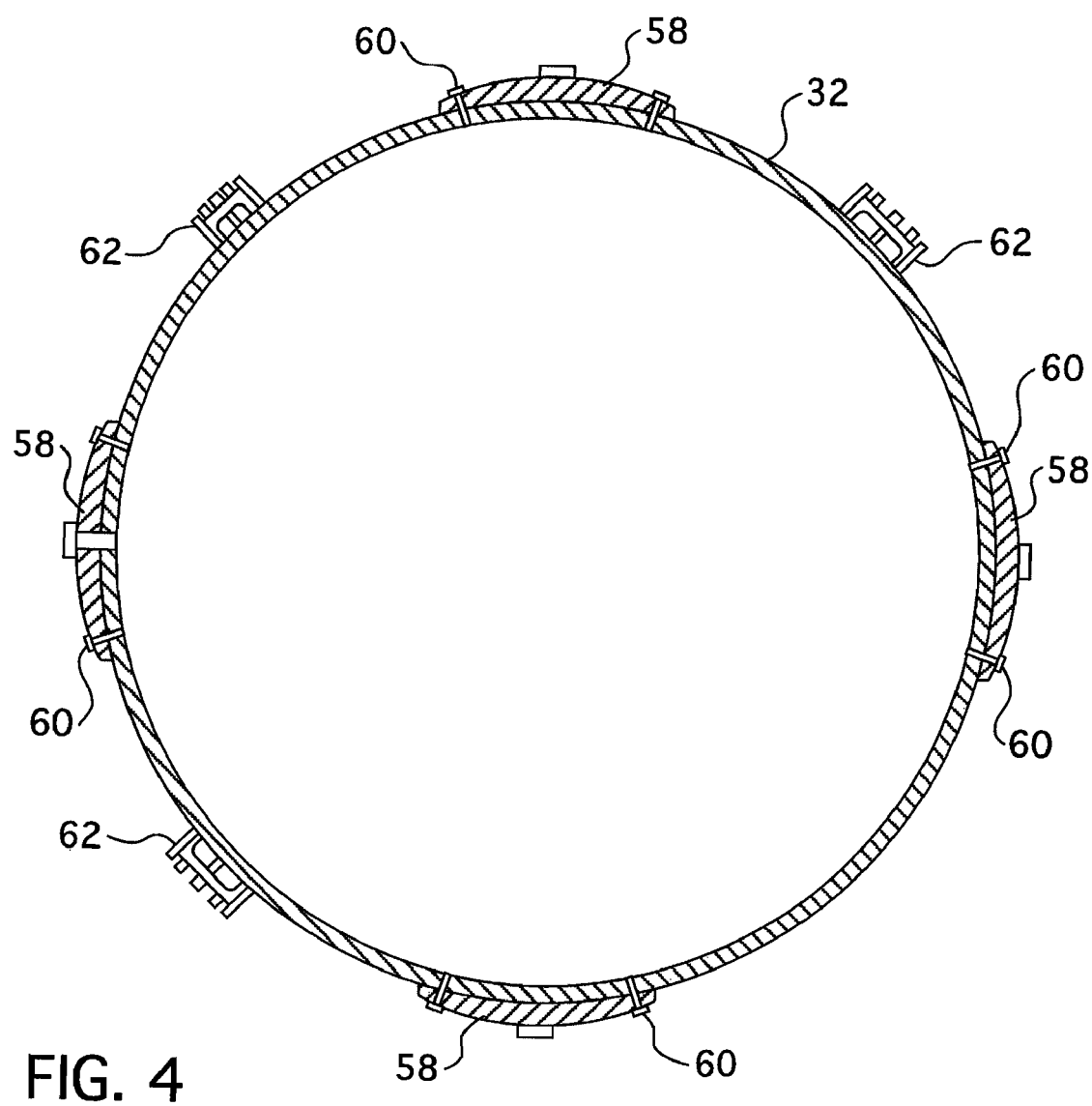
FIG. 4 is a cross section of a core barrel taken through the neutron shield panels of this invention.

A cross section of the core barrel 32 showing the neutron shield panels 58 of this invention is illustrated in FIG. 4. The neutron shield panels 58 are shown at the periphery of each of the cardinal axis of the core barrel 32 and are secured at the center and each circumferential end by the bolts 60. As can be seen in FIG. 4, the neutron shield panel 58 is thickest at its center and tapers to the sides. Preferably, the center is three inches (7.62 centimeters) thick and the panels tapers in the circumferential direction to proximately one inch (2.54 centimeters). The bolts 60 extend through holes in the neutron shield panel and are screwed into corresponding openings in the core barrel 32. The baskets 62 spaced around the core barrel 32 support specimens of reactor vessel material that are periodically removed from the reactor for testing to determine the condition of the vessel metal.

Figure 6:
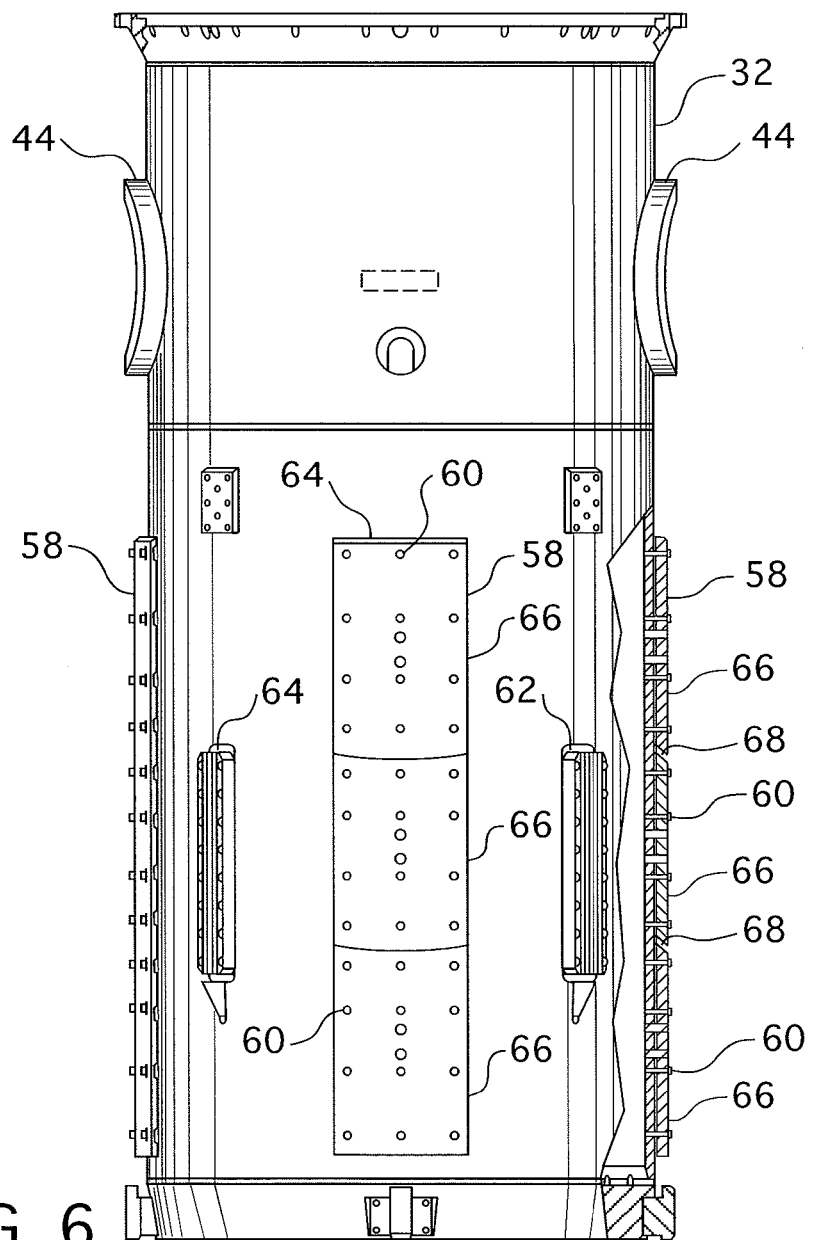
FIG. 6 is an elevational view of a core barrel, partially in section, with a neutron shield of this invention shown on three sides.

FIG. 6 shows an elevational view of the core barrel 32 with a portion cut away to show a side view of the connection of the neutron shield panel 58 to the core barrel wall. The neutron shield panel 58 shown in FIG. 6 is made up of three separate rectangular sections 66 to reduce the stress on the bolts 60 that fasten the sections 66 to the core barrel 32, as a result of differentials in thermal expansion between the carbon steel core barrel and the stainless steel neutron shield panel sections 66. As shown in FIG. 6, each of the panel segments 66 are substantially rectangular with the longer dimension in the vertical direction. Generally, aside from the upper beveled edge 64 above the upper panel 66, all three panels 66 are of the substantially same design.

As can be seen from the neutron shield panel on the right side of FIG. 6, the interface between panel segment 66 has a sloped opposing edge that inversely matches the slope on the opposing edge of the adjacent segment 66 and the opposing adjacent edges are spaced from each other to permit reactor coolant to pass therebetween to cool the segments. Preferably, each of the segments 66 are constructed from stainless steel.

Figure 5:
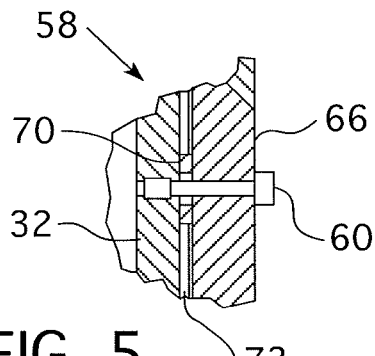
FIG. 5 is a partial cross section of a portion of a neutron shield bolted into the outer surface of the core barrel with a washer therebetween to provide for a standoff.

FIG. 5 shows an enlarged section of the coupling between the neutron shield panel 66 and the core barrel 32. A washer 70 is interposed between the core barrel 32 and the neutron shield plate 58 to maintain a space 72 therebetween for the passage of coolant to assist the cooling of both the core barrel and the neutron shield panel.

Figures 7, 8:
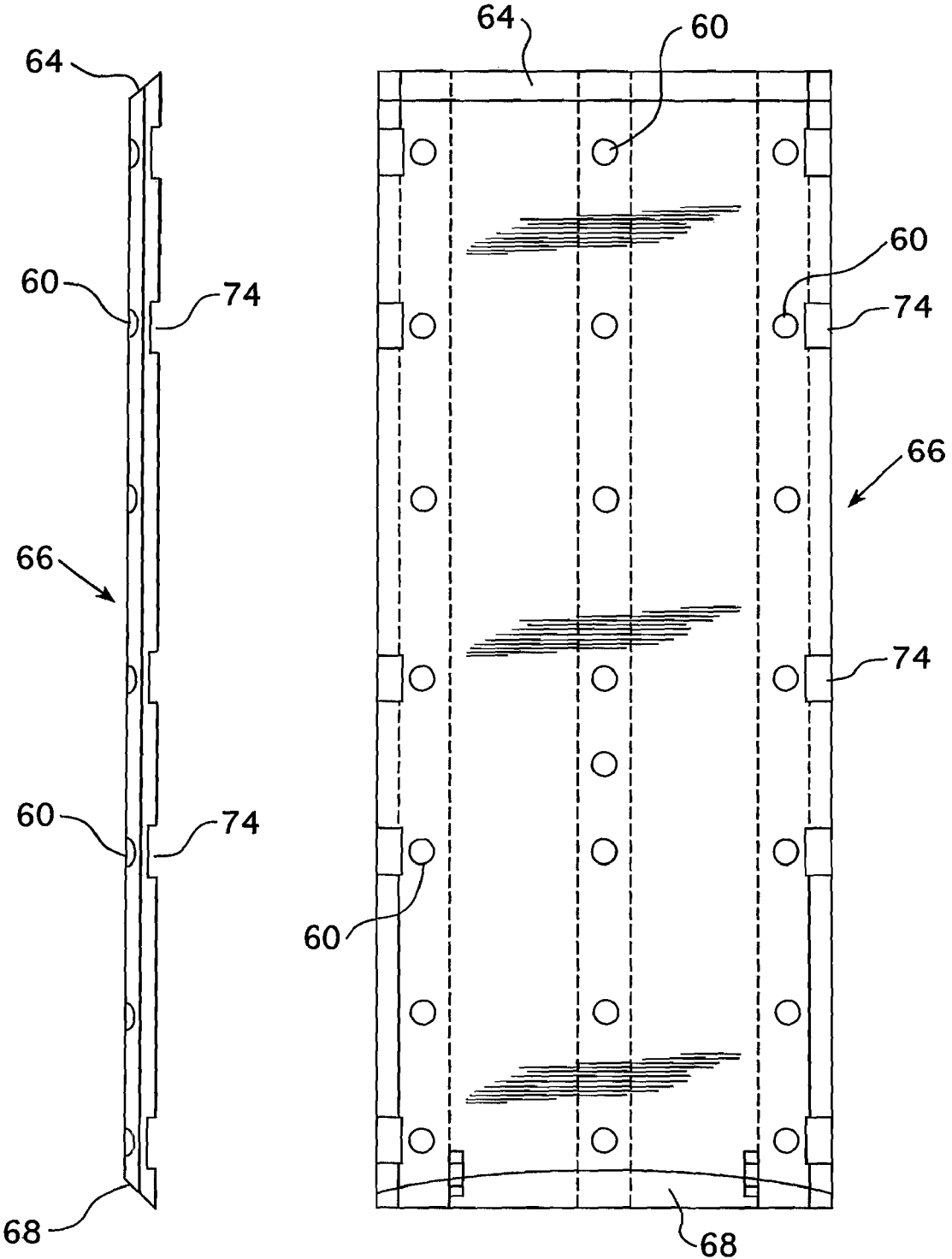
FIG. 7 is a side view of one neutron shield panel segment.
FIG. 8 is a planned view of the neutron shield panel segment shown in FIG. 7.

FIG. 7 shows a side view of a neutron panel segment 66 and FIG. 8 shows a front view of the neutron panel 66. From the views in FIGS. 7 and 8, the beveled top portion 64 and the sloped lower portion 68 previously noted with respect to FIG. 6, can be better viewed. In addition, circumferential cooling channels 74 are provided on the underside of the panels 66 to further promote cooling.

Desirably, as mentioned above, three such panels 66 are stacked in tandom at each of the four cardinal coordinates around the core on the outside of the core barrel 32 and are affixed to the core barrel by the bolts 60. Though it should be appreciated that as an alternative a single panel extending the height of the fuel rods can also be employed provided the means for affixing the extended panel to the outside of the core barrel is designed to accommodate any differences in thermal expansion between the material of the neutron shields 58 and the core barrel 32.

One of the key aspects of this invention is to have the panels vary in thickness in the circumferential direction such that the greatest radial thickness is at the point of highest fluence with lesser thicknesses at adjacent locations where the fluence level is lower. This arrangement permits a relatively smaller reactor vessel diameter, which reduces the impact on other parts of the plant design. In addition, with a variable thickness in the circumferential direction, the downcomer flow blockage is reduced so that the reactor pressure vessel pressure drop and internals vibration levels are lower than with the uniform panel thickness as is used in more conventional reactor designs. Because the thickness of the panels is greatest at the location of highest fluence, the benefit of the thickness is obtained where it is needed and is less where the fluence is lower.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor comprising:
a pressure vessel having an interior sidewall:
a core barrel disposed within the pressure vessel for circumferentially surrounding a nuclear core, the core barrel and the pressure vessel sidewall defining a downcomer region; and
a plurality of circumferentially spaced apart neutron panels disposed in the downcomer region, each panel having a concave surface facing the core barrel and a convex surface facing the pressure vessel sidewall, with each panel having a variable thickness from a center to a side between the concave surface and the convex surface, wherein the thickness of the neutron panels varies in the circumferential direction and is greatest at the center and tapers to the sides.

2. The nuclear reactor of claim 1 wherein the thickness is approximately 3 inch, or 7.62 cm, in the center and tapers to approximately 1 inch, or 2.54 cm, on the side.

3. The nuclear reactor of claim 1 wherein the neutron panels are constructed of stainless steel.

4. The nuclear reactor of claim 1 wherein a top of the neutron panels is chamfered.

5. The nuclear reactor of claim 1 wherein the core barrel has a central axis that extends in a vertical direction and the neutron panels are constructed from a plurality of separate segments that are stacked vertically.

6. The nuclear reactor of claim 5 wherein each of the segments are rectangular having two longer sides with the longer sides extending in the vertical direction.

7. The nuclear reactor of claim 5 wherein each of the segments are approximately the same size.

8. The nuclear reactor of claim 5 wherein the number of segments is three.

9. The nuclear reactor of claim 5 wherein each of the segments is bolted to the core barrel.

10. The nuclear reactor of claim 5 wherein at least a portion of the concave surface of the neutron panel is spaced from an outside diameter of the core barrel by a standoff.

11. The nuclear reactor of claim 10 wherein the standoff is a washer.

12. The nuclear reactor of claim 5 wherein each neutron panel segment has a sloped opposing edge that inversely matches the slope on the opposing edge of the adjacent segment wherein the opposing adjacent edges are spaced from each other to permit reactor coolant to pass there between to cool the neutron panel segments.

13. The nuclear reactor of claim 1 wherein the neutron panels have grooves in the concave surface facing the core barrel that promotes cooling.

* * * * *